United States Patent [19]

Krieg

[11] 4,252,481
[45] Feb. 24, 1981

[54] CUTTING TOOL

[75] Inventor: Adrian H. Krieg, Woodbridge, Conn.

[73] Assignee: Widder Corporation, Naugatuck, Conn.

[21] Appl. No.: 50,758

[22] Filed: Jun. 21, 1979

[51] Int. Cl.³ .............................................. B23B 51/00
[52] U.S. Cl. ................................. 408/229; 408/233; 407/57
[58] Field of Search ............... 408/211, 227, 228, 229, 408/230, 231, 233; 407/57, 61, 63, 53; 29/78; 76/101 A

[56] References Cited

U.S. PATENT DOCUMENTS

| 1,449,977 | 3/1923 | Filson | 408/211 |
|---|---|---|---|
| 1,737,580 | 12/1929 | Fleming | 408/231 |
| 2,035,802 | 3/1936 | George | 29/78 |
| 3,020,787 | 2/1962 | Cusick | 408/211 |
| 3,678,551 | 7/1972 | Pietroski | 29/78 |
| 3,754,832 | 8/1973 | Stickler | 408/211 |
| 3,869,773 | 3/1975 | Gneiding | 29/78 |

FOREIGN PATENT DOCUMENTS 841183  7/1960  United Kingdom ...................... 29/78

Primary Examiner—Leonidas Vlachos

[57] ABSTRACT

A rotary cutting tool is formed in the shape of a wheel in which the spokes extend arcuately and downwardly to a central hub with the lower edge of these spokes having a cutting edge formed thereon or attached thereto. The spokes in addition to extending downwardly in the direction of the workpiece are curved in the vertical direction to form an upwardly slanting surface along which the material sheared off by the cutting edge may ride and be discharged between the spokes. The hub of the tool is connected to a shaft which may be rotated by a hand-held electric drill or similar device.

1 Claim, 5 Drawing Figures

CUTTING TOOL

This invention relates to a cutting tool of the type designed to remove burs or excess metal as may result, for example, in the case of welded joints. It is, moreover, usable for the removal of undesirable protuberances from a plane wood surface.

At the present time, particularly in smoothing the surfaces of welded joints such as spot-welded aluminum joints, it is commonplace to use an abrasive tool which, instead of removing the undesired metal, tends to spread it. A truly smooth surface desirable and/or necessary for certain purposes is, therefore, either not attainable, or only attainable with a substantial amount of prolonged abrasive action.

Ordinary rotary cutters, moreover, are not suitable for this purpose since they merely chip away at the welds, leaving a rough surface which must be smoothed where possible by known abrasive methods.

An object of the present invention is to provide a cutting tool which will cleanly remove protrusions, such as welds, from an otherwise smooth surface, thereby leaving an overall planar surface minus such protrusions.

A further object of this invention is to provide a cutting tool having a sharp shearing action to remove welds and other protuberances from an otherwise planar surface, thus leaving said surface completely smooth without either spreading the undesired metal or leaving rough spots thereon.

An additional object of the invention is the provision of a cutting tool as aforedescribed which will provide a shearing action along its entire cutting edge, thus making the tool readily usable in a hand-held electric drill or similar power source.

These and other objects and advantages of the invention will become apparent from the following description of a preferred embodiment thereof, illustrated in the accompanying drawings in which.

The cutting tool, as illustrated, is generally in the form of a wheel having a rim 2 from which extend a plurality of downward, somewhat arcuate spokes 4, coming together to form a central hub 6. Preferably the said rim, spokes and hub are cast as a single integral piece.

Figure 1:
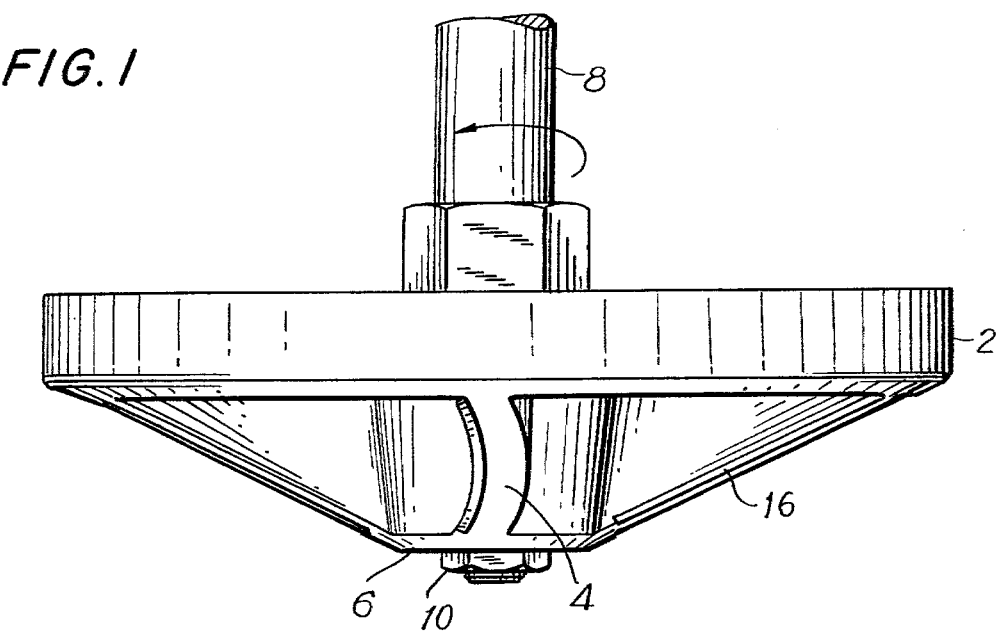
FIG. 1 is a vertical plan view of the cutting tool according to the present invention.
Figure 2:
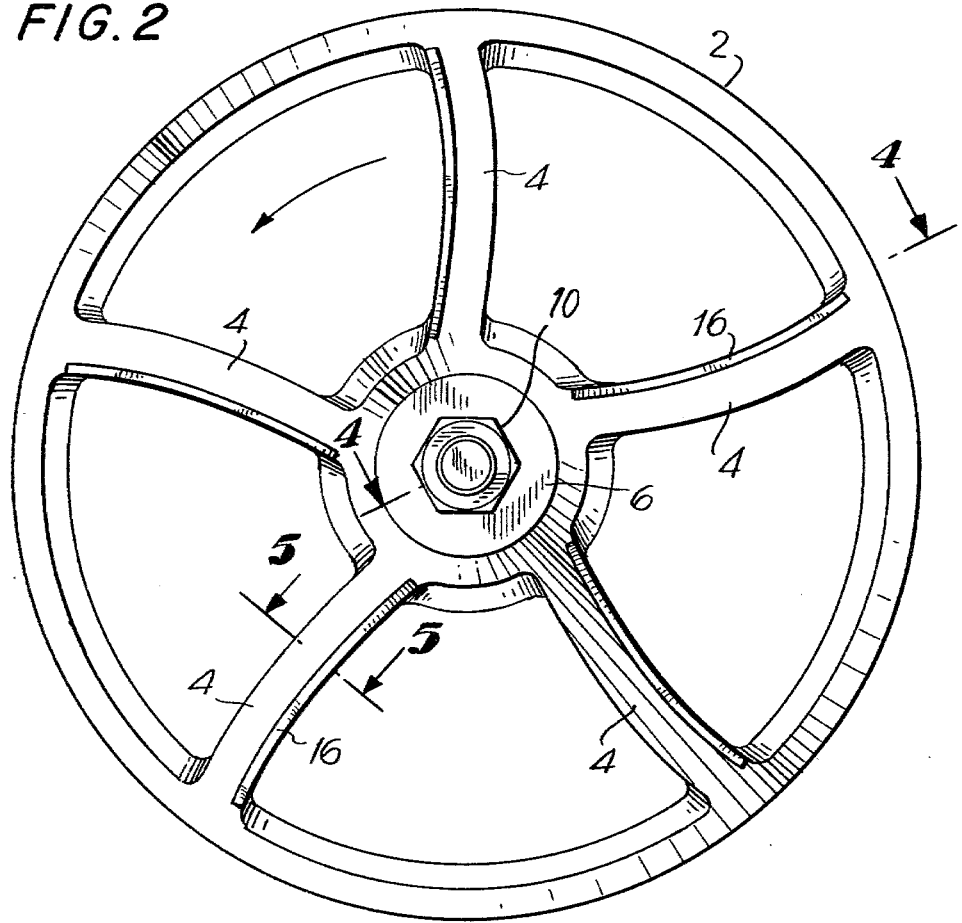
FIG. 2 is a bottom plan view of the tool illustrated in FIG. 1.
Figure 3:
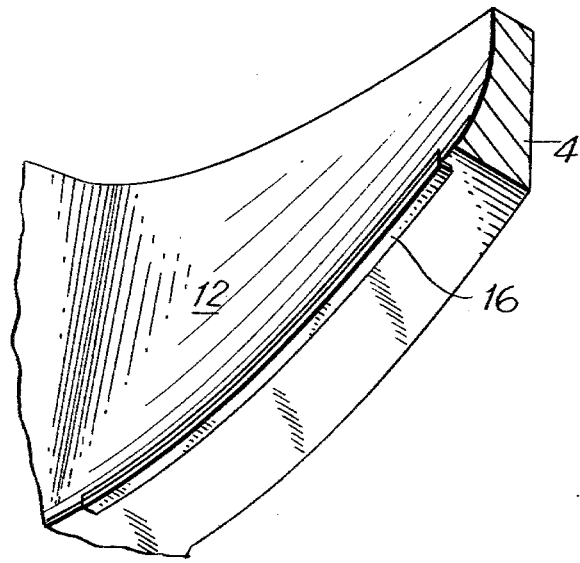
FIG. 3 is an enlarged view shown in perspective of the cutting edge of the tool of FIGS. 1 and 2.
Figure 4:
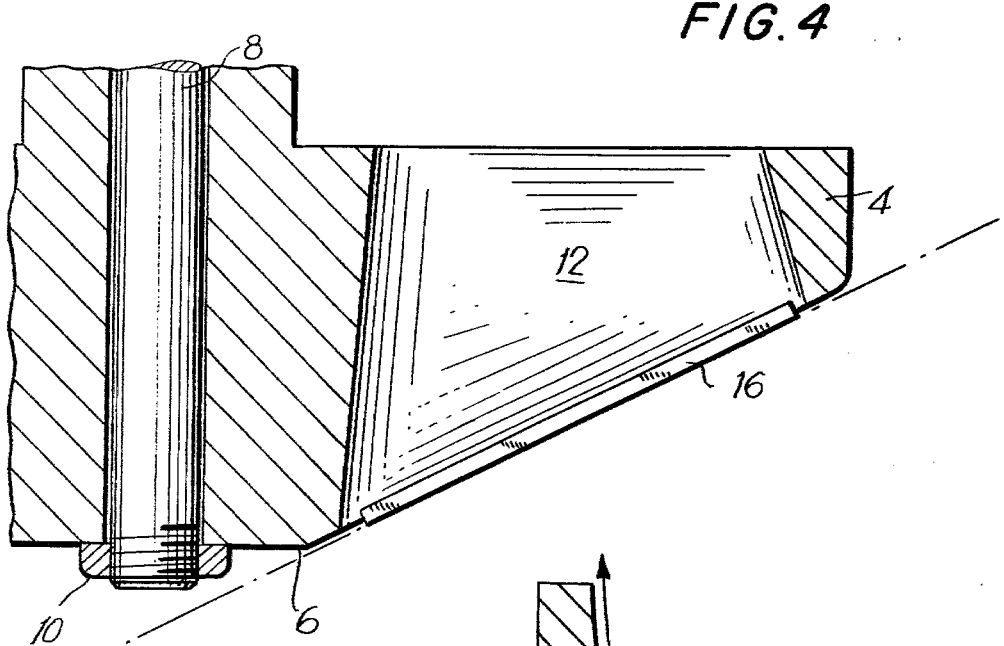
FIG. 4 is an enlarged cross-sectional view along the lines 4—4 of FIG. 2.

The aforesaid wheel structure is preferably attached to shaft 8 by suitable means such as nut 10, the shaft 8 being in turn fixed in the bit of an ordinary hand-held drill (not shown). Spokes 4, in addition to having an arcuate concave shape from center to rim, as seen in the direction of rotation, are formed with a downwardly and forwardly extending surface 12 as more clearly shown in FIGS. 3-5. At the lower forward edge 14, there is provided a cutting insert 16 formed of any material having suitable cutting characteristics such as hardened tool steel or carbide. This insert may be attached by any of the well-known adhesives suitable for this purpose, by soldering or suitably screwed thereto.

Figure 5:
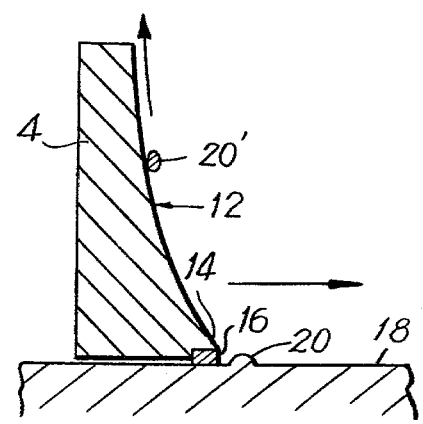
FIG. 5 is an enlarged cross-sectional view along the lines 5—5 of FIG. 2.

It will be noted that as a result of the arcuate shape of the spokes and the corresponding arcuate cutting edge, shearing action will take place along the entire edge, generally irrespective of the angle at which the tool may be held in relation to the workpiece. The unique operation of the cutting wheel according to this invention is best illustrated in FIG. 5. The cutting tool is assumed to have been attached to a hand-held rotary drill with the spokes rotating in the direction of the arrow. When the tool is applied to workpiece 18, cutting edge 16 will shear protuberance 20 which may, for example, be a spot weld. The sheared-off piece, or particle 20', will, by movement of the tool and the force of the shear, ride up inclined surface 12 and out of the open top of the tool; particles accordingly will not accumulate along the working surface. Since the cut is a shearing action, if the workpiece is a soft metal such as aluminum, the metal will not spread and leave uneven surfaces as presently results from the prior practice of utilizing the normal type of abrasive tool.

While, for illustrative purposes, I have shown and described a particular form of tool to meet the objectives first stated, it will be clear to those skilled in this art that variations therefrom are contemplated. While the cutting tool wheel has been shown with five spokes providing five cutting edges, more or less could be used, with, for example, a minimum of three spokes and a maximum of perhaps thirteen; it has been found advantageous, however, to use an odd number to lessen vibration. The radius of the concave arc of the spokes is purely illustrative, as is the vertical slope thereof. Means other than those specifically shown may be used to attach the cutting wheel to drill shaft 8.

Accordingly, the invention is not deemed as limited to the exact configuration illustrated, except as set forth in the claim which follows.

What I claim is:

1. A rotary cutting tool comprising a rim, a central hub, a plurality of arcuately shaped downwardly extending spokes integrally connecting said rim to said hub, each of said spokes having one downwardly slanting surface extending forwardly in the direction of rotation of the tool to form an arcuately shaped extended lower edge, means forming an arcuate cutting edge along said lower edge of each spoke, a shaft, and means attaching said hub to said shaft.

* * * * *